United States Patent [19]

Finch et al.

[11] 4,415,462

[45] Nov. 15, 1983

[54] SELF-CLEANING SCREEN

[76] Inventors: Harvey E. Finch, 121 Shooting Star Isle, Foster City, Calif. 94404; James J. Strong, 440 Vidal, San Francisco, Calif. 94132

[21] Appl. No.: 407,467

[22] Filed: Aug. 12, 1982

[51] Int. Cl.³ .............................................. B07B 1/06
[52] U.S. Cl. .................................... 210/767; 210/170; 210/162; 405/82; 119/2
[58] Field of Search ............... 210/163, 747, 153, 155, 210/156, 170, 800, 801, 162, 767; 119/3; 405/82

[56] References Cited

U.S. PATENT DOCUMENTS 4,260,286  4/1981  Buchanan ............................... 405/81

FOREIGN PATENT DOCUMENTS 1361317  10/1962  France ................................... 210/162
542017  4/1956  Italy ..................................... 210/155

Primary Examiner—Charles N. Hart
Assistant Examiner—Sharon T. Cohen
Attorney, Agent, or Firm—Christie, Parker & Hale

[57] ABSTRACT

A self-cleaning screen and method for screening water for hydraulic turbine intake diversions is disclosed. A check dam is established across a river on the downstream side of a side channel weir which is at a lower elevation than the dam. A fish transport trough is laterally spaced from the weir at a lower elevation and has an inlet upstream of the weir and an outlet downstream of the dam. A screen having a concave profile is connected between the weir and the trough to remove debris from water flowing over the weir. Water flowing through the screen enters a separate channel under the screen for diversion to a hydraulic turbine inlet water application. Intermittent surges of water over the weir flush debris off the edge of the screen into the trough to clean the screen.

13 Claims, 4 Drawing Figures

SELF-CLEANING SCREEN

FIELD OF THE INVENTION

This invention relates to a self-cleaning screen for screening water for hydraulic turbine intake diversions which protects both the turbine as well as fish.

BACKGROUND OF THE INVENTION

Hydroelectric turbines are used for generating electricity. Many turbines are being used in rivers and streams where there is fish and other wildlife. The water that flows to the turbine is diverted from the stream. This water must be screened to prevent debris and particles from entering the turbine and damaging its moving parts. Recently several state regulatory agencies have promulagated rules for the protection of fish habitats. These rules require turbine operators to provide water channels for the fish to bypass the turbine diversions.

At the present time, turbine and fish protection is accomplished by installing vertical perforated panels (or slot - type screen panels) supported by a steel frame in the water at some distance upstream from the turbine intake. A motorized brush is made to travel across the screen and sweep debris from the screen face to prevent clogging. Typically the debris is taken downstream from the screen panels by releasing water over a weir. This same weir also serves as a bypass by providing ladders for the fish to use.

There are several problems with the preexisting systems. First, power is needed to operate the brush. The diversion is typically far removed from the power supplies at the turbine. Running power lines to the brush is troublesome and expensive. Occasionally large debris such as logs or other flotsam will jam the brush. Periodic checkups of the system are needed along with maintenance, repair and servicing of the brush.

There is need for a system for protecting turbines and fish which is self-cleaning and needs minimal operator attention.

SUMMARY OF THE INVENTION

This invention provides both apparatus and methd for screening intake water for hydraulic diversions which meets current requirements for providing fish access to their natural habitats. The apparatus comprises a check dam across a river or the like for maintaining a first water level in the river, and a side channel weir on one bank of the river upstream on the check dam. The elevation of the weir is sufficiently lower than the check dam for diverting water to flow over the weir. The invention further comprises a first water channel having an inlet upstream of the weir and an outlet downstream of the check dam. The first water channel is spaced laterally from the weir at a lower elevation than the weir. A screen is connected between the weir and the first water channel. A second water channel under the screen supplies water passing through the screen to supply the intake of a hydraulic turbine.

In terms of method, the invention comprises establishing a dam across the river, causing water to flow over a weir of one bank of the river on the upstream side of the dam, providing a path for water to flow from upstream of the weir to downstream of the dam, the path being laterally spaced at a lower elevation from the weir, and screening the water flow over the weir to remove debris from the water flow. The screened water falls through a screen to a channel coupled to the hydraulic turbine diverson. Any remaining water flowing over the screen flushes debris from the screen into a trough.

DESCRIPTION OF THE DRAWINGS

These and other features and advantages of the invention will become more apparent when the following description is read together with the drawings, wherein.

DETAILED DESCRIPTION

Figure 1:
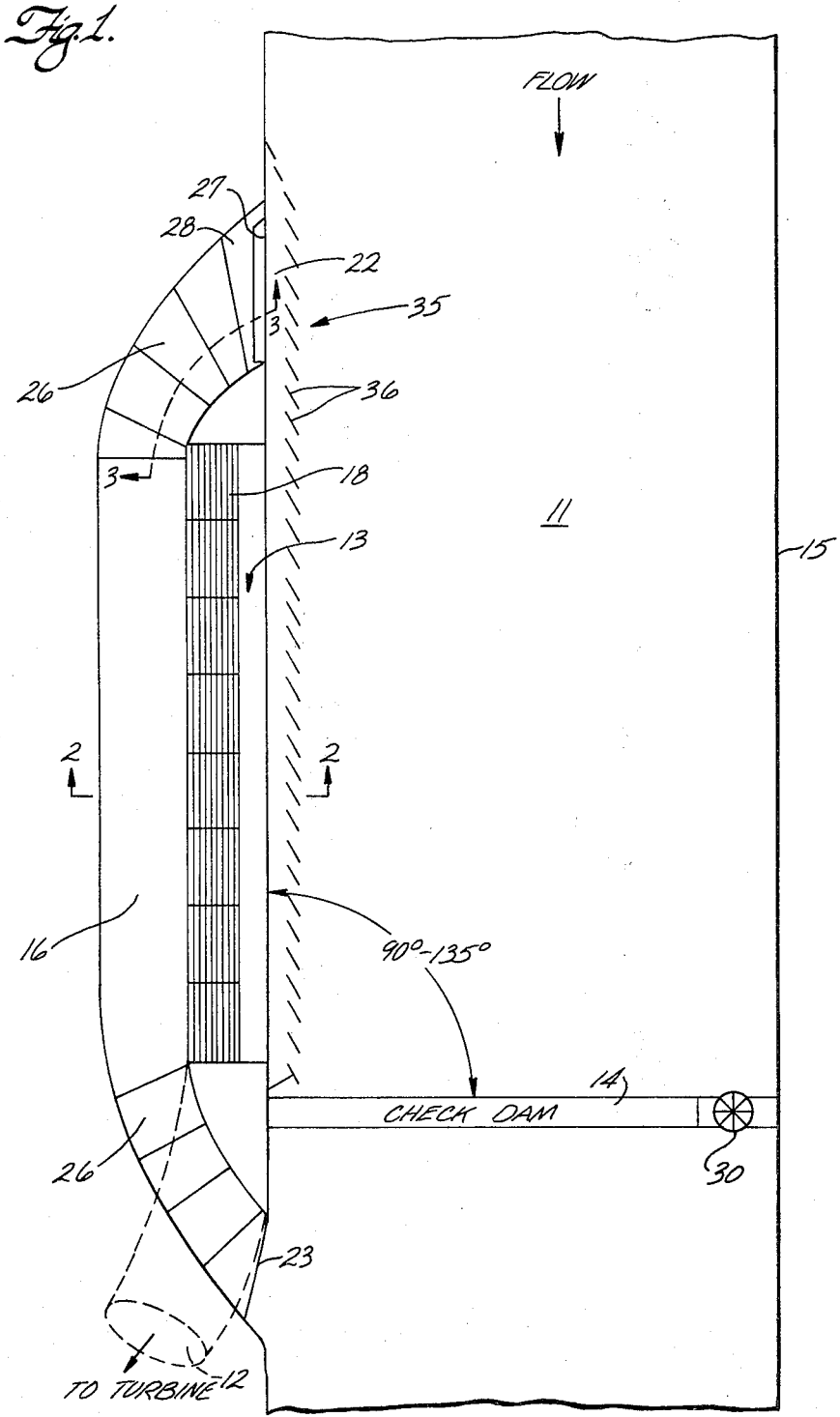
FIG. 1 is a plan view of a self-cleaning screen installed in a river upstream from a hydraulic turbine, according to this invention.

A self-cleaning screen is placed in a river 11 upstream from a hydroelectric turbine inlet diversion 12. Water entering the diversion flows to the turbine. A check dam 14 across the body of the river establishes a minimum level of water at the dam. Just upstream of the check dam along one bank of the river is a side channel weir 13. The side channel weir has a lower elevational than the check dam and the opposite bank 15 of the river so that water will flow over the side channel weir. A fish transport trough 16 is laterally spaced from the outside of the side channel weir. The trough is a path for directing water flow. The trough is at a lower elevation than the weir. The trough has an inlet 22 just upstream of the side channel weir. An outlet 23 returns water in the trough back to the river downstream of the check dam.

A screen 18 is connected between the side channel weir and the fish trough. Below the screen runs a turbine water channel 24 which leads to the turbine inlet diversion 12. Water can enter the turbine water channel only by first passing through the screen. The turbine channel and the fish transport trough are separate pathways for water flow.

Water flowing over the side channel weir passes over the screen 18. Much of the water passes through the screen and enters the turbine water channel 24, from where it is diverted to flow to the turbine. The screen removes debris from the water flowing over the side channel weir to protect the hydraulic turbine. Any water not flowing through the screen flushes into the fish transport trough.

The screen is made from profile wire. The upper face of each individual wire 44 is roughly tangential to the contour of the screen, which is preferably a concave arc. Between each pair of neighboring wires 45 is a slot 46. The neighboring wires are held in place by a lattice of cross members 47 on the underside of the screen. When water flows over the screen, it tends to separate in thin slices and cling to the wall of the preceding wire bar. This causes fluid to accelerate through the screen. Particles and other debris, however, tend not to flow through the screen but rather slide over it and fall over its lower edge into the fish transport trough. The width of the slots 46 can be between about 0.010 inches to about 1.0 inches, with 0.080 inches being preferred. Particles having dimensions larger than the width of the slot will not enter the screen but instead will slide over its upper face, because the upper faces of the screen elements are tangential to the screen profile.

Intermittent surges of water over the weir flush any large debris remaining on the screen into the trough. The screen is continually self-cleaning. Any fish which swim over the side channel weir slide harmlessly over the screen and into the fish transport trough 16, from where they can swim through the outlet 23 back into the river.

While the screen is illustrated having a curved concave profile, it should be understood that the screen can also comprise one or more flat segmented panels having a linear or concave profile.

The elevation of the fish trough inlet 22 is less than the side channel weir, which in turn is less than the check dam. For example, the trough inlet can be about 4 inches lower than the side channel weir, which in turn can be about 5½ inches lower than the level of the check dam. The lower elevation of the fish trough assures constant water flow through it so that any fish passing over the side channel weir into the trough are returned to water quickly and are not left in the trough out of water. In addition, the presence of water in the fish trough allows for fish migration both upstream or downstream at all times of the year.

Preferably the inlet and outlet ends of the fish transport trough 16 are stepped to provide fish ladders 26 so that fish can swim upstream during their mating cycles. The lower fish ladder is aqueducted above the turbine water channel 24. To insure that sufficient water is supplied to the fish transport trough to accommodate fish passage throughout the year including seasons where water levels are below average, preferably the trough inlet 22 is provided with an adjustable height gate 27 just upstream of the uppermost ladder step 28. The gate can be raised or lowered as needed to insure adequate water to the trough. For example, the gate can be set about 1½ inches below the level of the side channel weir. The hydraulic gradient between the check dam elevation, the side channel weir, and the trough inlet and outlet should be sufficiently steep so as to permit incoporation of a fish ladder at both ends of the trough.

A bypass gate or valve 30 is provided in the check dam on the opposite side of the river from the side channel weir. The level of water in the river on the upstream side of the check dam can be controlled as needed during periods of high flow by opening the bypass gate. The depth of water flowing over the weir can also be adjusted by selectively operating the bypass gate. It is possible to provide flows across the screen 18 from about 0.25 cfs (cubic feet per second) to about 4.0 cfs per foot of weir length with about 1.0 cfs being presently preferred.

Preferably the check dam is angled slightly away from the side channel weir so that any debris accumulating on the check dam can be released by opening the gate. This arrangement works best of the check dam is angled from about 90° to about 135° away from the side channel weir.

To insure that sufficient water is provided to the turbine, preferably the turbine water channel 24 is provided with a low level alarm 32. A suitable alarm includes a water level sensor and is battery operated to avoid the need for providing electrical cables or power.

To impede the passage of large debris over the weir onto the self-cleaning screen, a trash rack 35 can be placed in front of the weir. Such a trach rack comprises a plurality of vertical parallel bars in a line in front of the weir. The tops of the bars are at or near the surface of the river. The trash rack prevents large debris from passing over the side channel weir and impedes water volume over the weir during periods of high flow. Preferably the individual bars 36 in the trash rack are angled about 45° from the face of the side channel weir to direct debris away from the weir. The spacing and angle of the vertical bars can dissipate energy to reduce the turbulence of water flowing over the weir.

Figure 2:
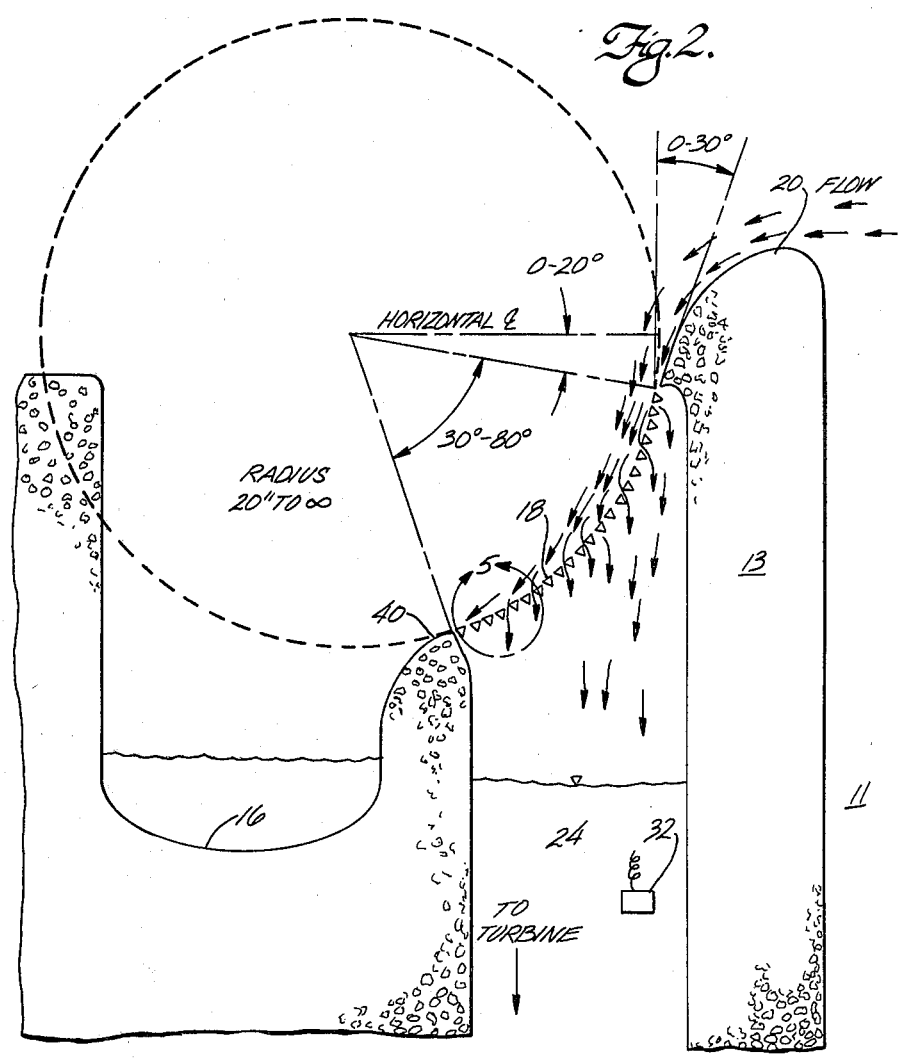
FIG. 2 is a cross-sectional elevation of the self-cleaning screen taken along lines 2—2 of FIG. 1.
Figure 5:
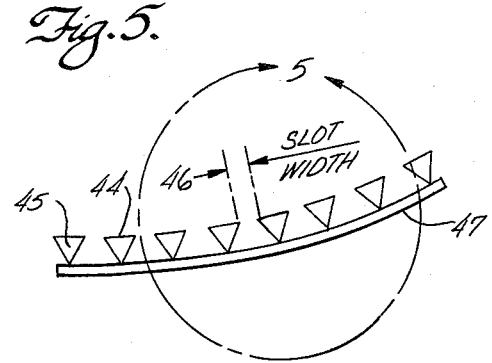
FIG. 5 is an enlarged cross-sectional elevation of the screen taken along lines 5—5 of FIG. 2.
Figure 3:
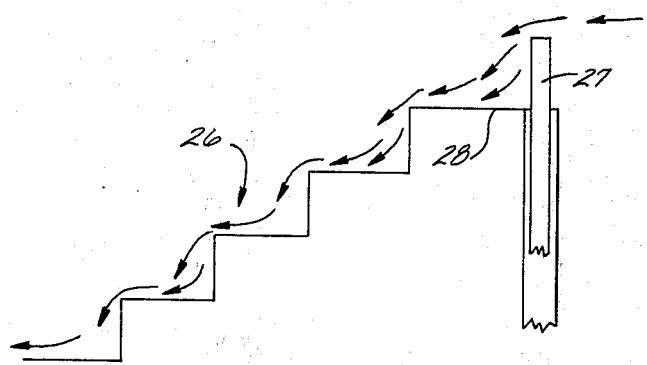
FIG. 3 is a schematic cross-sectional elevation of a fish ladder trough for the self-cleaning screen taken along lines 3—3 of FIG. 1.
Figure 4:
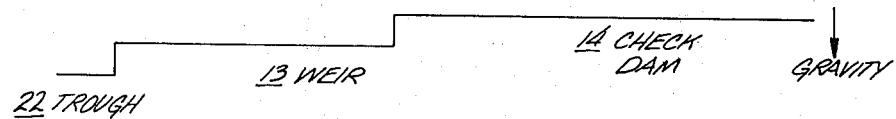
FIG. 4 is a hydraulic gradient for the self-cleaning screen.

FIG. 2 shows a cross-section of a typical portion of the self-cleaning screen. The weir has a convex profile that ends in a steep angle so that water flowing over the crest contacts the screen tangentially at an angle of about 0° to about 30° from the vertical, preferably at about 10°. The transition between the weir and the screen is smooth so that fish passing over the weir approach the screen tangentially and are not subjected to abrupt impacts that might cause descaling. The screen is contoured in a concave arc having a radius of from about 20 inches to infinity, preferably about 40 inches, and an angular extent of between about 30° to about 80°, preferably about 60°. A circle of dashed lines is superimposed on FIG. 2 to illustrate that the contour of the creen can follow circular arc. The concave contour makes the screen function as a slippery slide to guide fish and debris passing over the weir into the trough. The leading edge of the screen is offset from the horizontal by an angle of between about 0° to about 20°.

The crest 40 of the fish transport trough is controured to provide a smooth yet steep transition between the lower edge of the screen and the channel of water in the trough. Any debris passing to the lower edge of the screen can easily slide over the crest 40 into the trough. Any fish going over the weir will slide harmlessly over the screen into the trough without being out of water for any appreciable length of time.

What is claimed is:

1. An apparatus for screening intake water for hydraulic turbine diversions from a river or the like, the apparatus comprising:
   a check dam across the river for maintaining a first water level in the river;
   a side channel weir on one bank of the river upstream of the check dam, the elevation of the weir being sufficiently lower than the check dam for diverting water to flow over the weir;
   a first water channel having an inlet upstream of the weir and an outlet downstream of the check dam, the first water channel being spaced laterally from the weir at a lower elevation than the weir;
   a stationary screen connected between the weir and the first water channel; and
   a second water channel under the screen for supplying water passing through the screen to an intake of a hydraulic turbine.

2. An apparatus according to claim 1 wherein the screen has a concave contour.

3. An apparatus according to claim 2 wherein the screen comprises profile wire elements each having an upper face tangential to the contour of the screen.

4. An apparatus according to claim 2 wherein the weir has a crest which forms a smooth transition with the screen.

5. The apparatus according to claim 4 wherein the transition between the weir and the screen occurs at an angle of about 0° to about 30° from the vertical.

6. An apparatus according to claim 2 wherein the contour of the screen is an arc of between about 30° to about 80° angular extent.

7. An apparatus according to claim 1 wherein the inlet and the outlet of the first water channel comprise fish ladders.

8. An apparatus according to claim 7 further comprising means for adjusting the elevation of the inlet to control the flow of water in the first water channel.

9. An apparatus according to claim 1 further comprising valve means in the check dam for adjusting the elevation of the first water level relative to the side channel weir.

10. A method for screening debris from water from a river or the like for hydraulic turbine applications, the method comprising:
establishing a dam across the river;
causing water to flow over a weir on one bank of the river on the upstream side of the dam;
providing a path for water to flow from upstream of the weir to downstream of the dam, the path being laterally spaced at a lower elevation from the weir; and
screening the water flow over the weir to remove debris from the water flow, the screened water falling through a screen to a channel coupled to the hydraulic turbine application, any remaining water flowing over the screen flushing the debris into the path.

11. A method according to claim 10 wherein the water is caused to flow over the weir to contact the screen tangentially.

12. A method according to claim 10 wherein rate of water flow over the weir is from between about 0.25 cfs to about 4.0 cfs per foot of weir length.

13. A method according to claim 10 further comprising providing a fish ladder in the path.

* * * * *